United States Patent Office 3,700,621
Patented Oct. 24, 1972

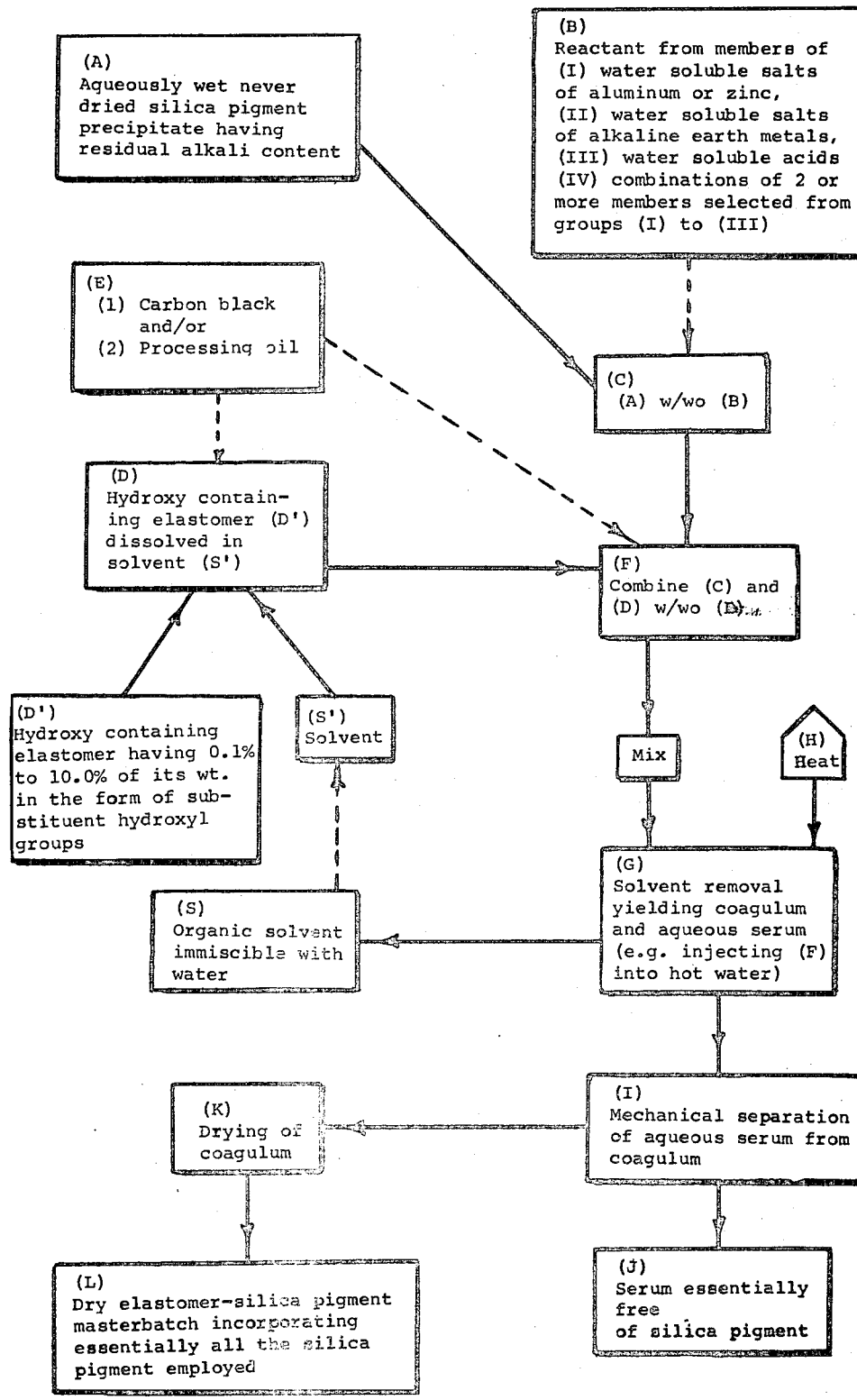

3,700,621
ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of applications Ser. No. 798,215 and Ser. No. 798,216, both Sept. 16, 1968, now abandoned, which are divisions of application Ser. No. 611,250, Jan. 24, 1967, now Patent No. 3,523,096, which in turn is a continuation-in-part of applications Ser. No. 458,379 and Ser. No. 458,420, both May 24, 1965, both now abandoned, and Ser. No. 479,806, Aug. 16, 1965, now Patent No. 3,401,017. This application July 16, 1970, Ser. No. 55,488
Int. Cl. C08c 11/10; C08k 1/08
U.S. Cl. 260—33.6 AO                    12 Claims

ABSTRACT OF THE DISCLOSURE

Curbing of silica pigment losses and the promotion of uniformity of product in the preparation of an elastomer-silica pigment masterbatch are effected (a) by combining (1) an aqueously wet hydrated silica pigment precipitate which has a bound alkali content, which has been prepared by precipitation from an aqueous alkali metal silicate solution, and which has been continuously maintained in an aqueously wet state without having been dried therefrom after its precipitation—with or without addition in aqueous solution of (2) reactant selected from the members of Group (I) the water soluble salts of aluminum and zinc, Group (II) the water soluble salts of alkaline earth metals, Group (III) the mineral acids and water soluble organic acids and Group (IV) combinations of any two or more of the foregoing members—with (b) an organic solvent dispersion of hydroxy containing elastomer having from 0.1 to 10% of its weight consisting of substituent hydroxyl groups—with or without (3) carbon black and/or processing oil—and (b) removing the solvent and aqueous phase and recovering the resulting combination as a masterbatch containing essentially all of the silica pigment employed.

CROSS REFERENCE TO RELATED APPLICATIONS

This application is a continuation-in-part of copending applications Ser. Nos. 798,215 and 798,216, filed Sept. 16, 1968, now abandoned, as divisions of application Ser. No. 611,250, filed Jan. 24, 1967, now U.S. Patent 3,523,096 said application Ser. No. 611,250 having been a continuation-in-part of earlier applications Ser. No. 458,420, filed May 24, 1965, (now abandoned); Ser. No. 458,379, filed May 24, 1965, (now abandoned); and Ser. No. 479,806, filed Aug. 16, 1965, (now U.S. Pat. No. 3,401,017), the disclosures of all of which are incorporated herein by reference.

BACKGROUND OF THE INVENTION (1) Field of the invention

The field to which this invention pertains is the preparation of masterbatches from solvent dispersions of elastomers and aqueous slurries of precipitated silica pigments.

BRIEF DESCRIPTION OF THE DRAWING

The single figure of the drawing is a block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses—(i.e. the formation of silica gel)—and to promote the precipitation of a silica pigment in finely divided form (i.e. in particles in the reinforcing size range of about 0.015 to about 0.150 micron, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregates, from the pigment particles of reinforcing size, which aggregates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitates having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

In this way the present invention, inter alia, provides a simple and efficient process for the curbing of silica pigment losses and the promotion of uniformity of product in the preparation of masterbatches of measured silica pigment content. As shown in the drawing, the invention provides a process for the curbing of silica pigment losses and the promotion of uniformity of product in the preparation of a silica pigment-elastomer masterbatch, which process comprises:

(a) providing an organic solvent dispersion (D) of elastomer containing (1) 100 parts of the elastomer by weight, (2) the solvent of which is essentially water immiscible, and (3) the elastomer of which consists essentially of hydroxy containing elastomer having from 0.1 to 10% of its weight consisting of substituent hydroxyl groups;

(b) providing 5 to 75 parts by weight, dry basis, of aqueously wet hydrated silica pigment precipitate (A) which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried after its precipitation;

(c) combining the wet silica pigment (A) provided by step (b) with from 0 to at least a stoichiometric equivalent, based on the alkalinity of the wet silica pigment, of reactant (B) selected from the class consisting of the members of the following groups. Group (I), the water soluble salts of aluminum or zinc; Group (II), the water soluble salts of the alkaline earth metals; Group (III), the mineral and water soluble organic acids; and Group (IV), combinations of any two or more of such members; thereby to provide a wet silica pigment (C) for use in step (d);

(d) then intimately mixing (as at (F)) the solvent dispersion of hydroxy containing elastomer (D) provided by step (a), together with the wet silica pigment (C) prepared for use by step (c), with (1) from 0 to 75 parts by weight of carbon black with the limitation that the total of silica pigment and carbon black, dry basis, not exceed 80 parts by weight, and with (2) from 0 to 45 parts by weight of processing oil; and (e) separating the volatiles from the resulting masterbatch.

The hydroxy containing elastomer (D') is dissolved in solvent (S')—which may be recycled solvent (S)—and said solvent itself, or as an azeotrope with water, preferably has a boiling point lower than that of water at atmospheric pressure, and the viscosity of the elastomer-solvent dispersion (i.e. solution) (D) preferably should lie in the range of 5,000 to 50,000 centipoises, as this viscosity facilitates the intimate blending of the hydroxy containing elastomer-solvent solution (D) and the treated or untreated wet silica pigment (C).

The silica-elastomer masterbatch recovery is effected by separating the volatiles from the coagulum, preferably in two steps (G) and (I) when the solvent or its aqueous azeotrope can be volatilized in step (G) with the aid of heat (H), prior to separation of the solids from the remaining aqueous phase in step (I). The volatilizing of the solvent, step (G) to convert the mixture (F) to coagulum (K) and aqueous serum (J) may be effected by running the dispersion (F) into hot water. The greater part of the separation of the coagulum from the aqueous serum in step (I) is preferably effected by mechanical de-watering, e.g. filtration, decanting, centrifuging, etc., to reduce the heat required for final drying of the masterbatch. The serum removed by mechanical de-watering is found to be essentially free of silica pigment as indicated at (J) in the drawing and the dry elastomer-silica pigment masterbatch (L) thus incorporates essentially all of the silica pigment employed in (C). The process thus curbs silica losses and assures a uniform silica pigment content in the materbatch.

In the several categories of the invention tabulated in Table A, the dispersions (i.e. solution), of hydroxy containing elastomers for masterbatching with the wet silica pigment may have concentrations of from 5 to 50%, preferably 10 to 30% dry solids by weight, with from 0.1 to 10%, preferably 0.5 to 5%, of the weight of the elastomers in the form of substituent hydroxyl groups. The several categories of the invention tabulated in Table A differ in the nature of the hydroxy containing elastomers from which the solutions thereof are prepared, and fall into three general categories, i.e. (a) hydroxy containing homo and copolymer elastomers, (b) hydroxy grafted homo and copolymer elastomers and (c) the chemically hydroxylated homo- and copolymer unsaturated elastomers. As indicated in Table A: the hydroxy elastomers of category (a) may be prepared by emulsion or by solution polymerization; and the precursor polymers of category (b) and (c) may be natural rubbers, or elastomers prepared by emulsion polymerization, or those prepared by solution polymerization, and may be grafted with hydroxy containing monomers in latex or solution form, and the unsaturated precursor elastomers may be chemically hydroxylated.

TABLE A

Hydroxy containing elastomers which, in solution, are masterbatched with wet silica pigment according to particular embodiments of this invention:

(a) Elastomeric polymers (homo- or copolymers) of hydroxy monomers with and without nonhydroxy comonomers:
    (1) prepared by emulsion polymerization
    (2) prepared by solution polymerization
(b) Elastomeric precursor-polymers grafted with hydroxy containing monomers:
    (1) Natural rubber
        (a) so grafted in latex
        (b) so grafted in solution
    (2) Emulsion polymers (homo- and interpolymers)
        (a) so grafted in latex
        (b) so grafted in solution
    (3) Solution polymers (homo- and interpolymers)
        (a) so grafted in solution
(c) Elastomeric unsaturated precursor polymers chemically hydroxylated
    (1) natural rubber
    (2) emulsion polymer (homo- and inter-)
    (3) solution polymer (homo- and inter-)

In each of categories (a) and (b) of Table A, hydroxy containing monomers provide the hydroxyl groups of the elastomers. These hydroxy containing monomers are the ethylenically unsaturated monomers having not over 20 carbon atoms and containing at least one hydroxyl group, and may be selected from the class of ethylenically unsaturated mono- and poly-hydroxylic monomers the members of which fall in the groups set forth in Table B.

TABLE B

Unsaturated mono- and poly-hydroxylic monomers having from 2 to 20 carbon atoms (1) Alcohol monomers
(2) Hydroxylic diene monomers
(3) Hydroxylic mono- and poly-carboxylic acid ester monomers
(4) Hydroxylic mono- and poly-carboxylic acid monomers
(5) Hydroxylic amido, imido and cyano monomers
(6) Hydroxylic vinyl sulfide monomers
(7) Hydroxylic vinyl ether monomers.

Examples of the monomers of Table B include: aromatic alcohols such as, e.g., vinyl benzyl alcohol, 2-phenyl allyl alcohol, vinyl betahydroxyethyl toluene, betahydroxyethyl styrene, etc.; aliphatic alcohols such as, e.g., 3-hydroxy butene-1, allyl alcohol, 4-hydroxy pentene-1, methallyl alcohol, 2-hydroxymethyl allyl alcohol, 2-chloromethyl allyl alcohol, etc.; hydroxylic dienes such as, e.g., 2-hydroxymethyl butadiene-1,3, 2,3-bis-(hydroxymethyl)-butadiene-1,3, etc.; hydroxylic mono- and poly-carboxylic acid esters such as e.g., 2-hydroxyethyl acrylate, methyl α-(hydroxymethyl)-acrylate, ethyl α-(hydroxymethyl)-acrylate, butyl α-(2-hydroxyethyl)-acrylate, 2-hydroxypropyl acrylate or methacrylate, 3-hydroxypropyl acrylate or methacrylate, methyl α-(2-hydroxypropyl)-acrylate, ethyl α-(3-hydroxypropyl)-acrylate, 4hydroxybutyl acrylate, 5-hydroxyamyl acrylate, 6-hydroxyhexyl, acrylate, 7-hydroxyheptyl acrylate, 8-hydroxyoctyl acrylate, 9-hydroxynonyl acrylate, 10-hydroxydecyl acrylate, 2-hydroxyethyl methacrylate, 6-hydroxyhexyl methacrylate, 8-hydroxyoctyl methacrylate, 10-hydroxydecyl methacrylate, 3-hydroxypropyl crotonate, 5-hydroxyamyl crotonate, 6-hydroxyhexyl crotonate, 7-hydroxyheptyl crotonate, 10-hydroxydecyl crotonate, di(2-hydroxyethyl) maleate, di-(4-hydroxybutyl) maleate, di(6-hydroxyhexyl) maleate, di(9-hydroxynonyl) maleate, di(10-hydroxydecyl) maleate, di(2-hydroxyethyl) fumarate, di(2-hydroxypropyl) fumarate, di(4-hydroxybutyl) fumarate, di(6-hydroxyhexyl) fumarate, di(10-hydroxydecyl) fumarate, and the like; butyl bis-(betahydroxyethyl) itaconate, ethyl betahydroxyethyl maleate, 2,3-dihydroxypropyl acrylate, 3,5-dihydroxyamyl crotonate, 6,10-dihydroxydecyl methacrylate, di-2,6-dihydroxyhexyl maleate, di-2-chloro 7-hydroxyheptyl fumarate and the like; hydroxylic mono- and polycarboxylic acids such as, e.g., alphahydroxymethyl crotonic acid, hydroxymethyl fumaric acid, hydroxypropyl maleic acid, etc.; hydroxylic amido monomers such as, e.g., alphahydroxymethyl acrylamide, N-methylol acrylamide, N-ethanol acrylamide, N-propanol acrylamide, N-methylol methacrylamide, N-ethanol methacrylamide, N-hydroxymethyl maleimide, N-betahydroxypropyl maleimide; alphahydroxymethyl acrylonitrile, etc.; the hydroxylic vinyl sulfide or vinyl ether monomers such as, e.g., β-hydroxyethyl vinyl sulfide, β-hydroxyethyl vinyl ether, 2-hydroxypropyl vinyl sulfide, 5-hydroxypentyl vinyl ether, 6-hydroxyhexyl vinyl ether, 8-hydroxyoctyl vinyl ether, 10-hydroxydecyl vinyl ether, thiodiglycol monovinyl ether, thiodiglycol monovinyl sulfide, diethyleneglycol monovinyl ether, and the like.

Most of the hydroxy containing elastomers of category (a) of Table A, more particularly those prepared from hydroxy containing monomers which do not homopolymerize to form elastomers, lie in the category of interpolymers. Such interpolymers may be prepared, for example, from ethylenically unsaturated monomer material consisting of from 2 to 98% by weight of non-hydroxy conjugated diene monomer material, 2 to 98% by weight of hydroxyl group containing ethylenically unsaturated monomer material copolymerizable with said conjugated diene monomer material and 0 to 96% by weight of other ethylenically unsaturated monomer material copolymerizable with said conjugated diene monomer material and said hydroxyl group containing ethylenically unsaturated monomer material; and further the said conjugated diene monomer material is selected from the group consisting of $C_4$–$C_{20}$ unsubstituted and hydrocarbon substituted, chloro-substituted, fluoro substituted and cyano-substituted butadiene - 1,3, e.g., isoprene, piperylene, the hexadienes, 2 - chlorobutadiene - 1,3, and the like; and the hydroxyl group containing ethylenically unsaturated monomer material copolymerizable with the selected diene is selected from the class set forth in Table B, and the ethylenically unsaturated non-hydroxy containing monomer material copolymerizable with said conjugated diene monomer material and copolymerizable with said hydroxyl group containing ethylenically unsaturated monomer material is selected in various embodiments from the monomers set forth in Table C.

TABLE C

Typical non-hydroxyl containing $C_2$–$C_{20}$ monomers employable as co-monomers in Table A Olefins such as e.g., ethylene, propylene, isobutylene, 3-methyl butene-1, butene-1, pentene-1, etc., mono- and poly-carboxylic acid esters such as, e.g., methyl methacrylate, ethyl acrylate, diethyl maleate, etc.; mono- and poly-carboxylic acids or anhydrides such as, e.g., acrylic acid, methacrylic acid, crononic acid, fumaric acid, maleic acid, maleic anhydride, itaconic acid, etc.; vinyl and vinylidene halides such as, e.g., vinyl chloride, vinyl bromide, vinylidene chloride, etc.; monovinylidene aromatic compounds such as styrene; aryl substituted alkyl styrenes such as, e.g. ortho-meta- and para-methylstyrenes, 2,4-dimethyl-styrene, para-ethyl styrene, etc.; aryl substituted halostyrenes such as, e.g., ortho-, meta-, and para-chlorostyrenes or bromostyrenes, 2,4-dichlorostyrene, 2-methyl - 4 - chlorostyrene, acrylonitrile, methacrylonitrile and the like.

Precursor polymers

The precursor elastomeric polymers employable in categories (b) and (c) of Table A, include: the natural rubbers such as e.g. Hevea, in latex or solution form; the emulsion polymerized elastomeric homo- and inter-polymers, such as the diene polymer rubbers, e.g. polybutadiene, polyisoprene, polychloroprene, and the copolymers of conjugated diene monomers and monomers containing and copolymerizable therewith through a single ethylenically unsaturated group, e.g. butadiene-styrene, butadiene-acrylonitrile or methacrylonitrile, butadieneacrylates or methacrylates; and rubbery copolymers of conjugated diene monomers with other vinylidene (including vinyl) monomers selected from the group set forth in Table C; and the solution polymerized elastomeric homo- and inter-polymers from olefins and diene monomers such as, e.g. butyl rubber, polybutadiene, polyisoprene, polyethylene, polypropylene, ethylene-propylene copolymers, ethylene-propylene-diene terpolymers, butadiene-styrene copolymers, butadiene-ethylene copolymers, propylene-butene-1 copolymers, and other solution polymerized elastomers.

The chemical hydroxylation of the precursor unsaturated elastomeric polymers in accordance with category (c) of Table A, may be effected in any known or suitable manner, e.g. by treatment of the unsaturated elastomeric polymer with peracetic acid.

Polymer solvents

In the practice of this invention the hydroxy containing polymer is employed in solution. It is often necessary to employ a solvent system to dissolve the said polymers as for example toluene and butanol. Certain polar solvents such as alcohols have the ability to hydrogen bond with the hydroxyl groups and thus break up the intermolecular hydrogen bonding of the polymer molecules and permit solution in a solvent such as toluene. In selecting the solvent the volatile hydrocarbon or halohydrocarbon, or halocarbon solvents are desirable, e.g.: butane, pentane, hexane, cyclohexane, heptane, methylene chloride, carbon tetrachloride, and the like.

Carbon black

By the term "carbon black" as used herein is meant any carobn blacks suitable for use by the rubber industry and set forth under the title "Carbon Blacks" at pages 251 to 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

By the term "processing oils" as used herein is meant rubber processing material of both liquid and solid types (if required the solids types can be converted to the liquid state for use herein with the aid of solvent or plasticizer) and include the procesisng materials set forth under "Plasticers and Softeners" at pages 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20, -419, -726, -757, -787 (TM), and Califlux TT (TM) and other oils suitable for rubber compounding or the oil extension of synthetic rubber; (d) the coumarone-indene oils and resins, e.g. Cumar Resin RH, -P10, -T (TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate, and the like; (f) the phenol formaldehyde thermoplastic resins, e.g. Durez 12687, 12707 (TM) and the like; (g) the hydrocarbon resins, e.g. Neville-LX 782, -LX 125, (TM), Para-Flux, Para Resin 2457 (TM); (h) the hydrocarbon resin-coumarone indene polymers, e.g. Picco Resins (TM); (i) the pine tars and pine tar oils, rosin and rosin oils, and tall oil and its derivatives e.g. PT-101, PT-401, PT-800 (TM); and the like.

DESCRIPTION OF PREFERRED EMBODIMENTS

In various of the examples, which are illustrative but not restrictive of the invention: (a) the wet silica pigment precipitate has a bound alkali content in the range of 0.1 to 10% by weight as $Na_2O$ and has been prepared by precipitation from an aqueous solution of alkali metal silicate with the aid of carbon dioxide and said silica precipitate has been continuously maintained in the aqueous phase without having been dried after its precipitation, (b) the aqueous silica pigment is combined with from 0 to at least a stoichiometric equivalent based on the alkalinity of the silica pigment slurry, of reagent selected from the class consisting of the members of Group (I) the water soluble salts of aluminum or zinc; Group (II) the water soluble salts of the alkaline earth metals; Group (III) the mineral acids and water soluble organic acids (e.g. acetic or hydroxyacetic acid) and Group (IV) combinations of any two or more of such members.

In the examples, the combination of the solvent dispersion of hydroxy containing elastomer and the wet silica pigment slurry was effected by intimate mixing in the high speed, high shear Waring Blendor. The removal of solvent from the intimate mixture was accomplished by dropping the said mixture into boiling water and the volatile solvent readily boiled off leaving a wet coagulum or wet crumb in the aqueous serum, which serum was free of silica or essentially free of silica.

Silica pigments containing residual alkali suitable for masterbatching in accordance with the present invention are usually precipitated by the gradual acidulation with the aid of carbon dioxide of aqueous sodium silicate solution.

EXAMPLES

The following examples will serve to illustrate the invention in more detail:

Silica preparation

The aqueous slurry of precipitated silica employed in Examples 5–24 and 29–33 was prepared in a manner similar to Example 9 of U.S. Pat. No. 3,250,594 except that the ratio of 41° Bé. commercial sodium silicate $(Na_2O/(SiO_2)_{3.22})$ to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% and the filter cake had a solids of approximately 10% by weight. The resulting aqueous silica slurry was designated wet alkaline silica pigment-I, and had a bound alkali content of about 1.5% by weight as $Na_2O$, and a serum pH of about 8.5 (8.5–9.5).

A portion of this alkaline silica filter cake was slurried with about a half volume of water and was acidified to a pH of 4.5 with dilute sulfuric acid and as a filter cake, with washing to a filtrate pH of about 7 to 7.5, had a solids of approximately 10% by weight. The resulting aqueously wet silica slurry was designated wet silica pigment-II.

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augumented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of relatively small water content (solids content 8 to 36%) are preferred.

To determine pigment quality a portion of wet silica pigment-II was dried at 105° C., micropulverized and compounded as set forth in Table I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2-methylene - bis(4-methyl-6-t.-butylphenol) | 2.0 |
| Magnesium oxide | 4.0 |
| Paracoumarone-indene resin [2] | 10.0 |
| Zinc oxide | 1.0 |
| N-tert-butyl-2-benzothilazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

[1] SBR 1502.
[2] Cumar Resin RH (a trademark product).

The compound was aged over-night, re-milled and cured for 45 minutes at 287° F.

The physical test data for the vulcanizate so prepared with the foregoing silica pigment is set forth in Table II hereof.

TABLE II

Silica tested (in vulcanizate) Silica pigment-II:
- Hardness (Shore A) _____ 72
- Tensile (p.s.i.) _____ 3530
- Modulus (300%) _____ 1140
- Elong. (percent) _____ 575

In certain of the examples the alkaline silica slurry is mixed with sufficient water soluble aluminum salt, zinc salt, alkaline metal salt and/or acid to react with substantially all of the bound and free alkali and thus reduce the aqueous silica slurry pH to 7.0 or lower.

It is preferable to employ a silica filter cake, with or without fluidizing by high shear working before or after treatment with reactant. This minimizes the water to be homogenized into the elastomer-solvent cement. Combining of the silica slurry and the hydroxy containing elastomer-cement is carried out in a typical high speed, high shear mixer. The solvent is readily removed by injecting the homogenized mix into hot or boiling water. To facilitate recovery, solvents are employed which are immiscible with water and which themselves, or as their azeotropes, boil lower than water at atmospheric pressure or at higher or lower pressures if it is desirable to employ such.

The solvents employed in the examples are typical of the $C_4$ to $C_8$ hydrocarbon solvents, e.g. hexane, benzene and toluene, and of the $C_1$ to $C_4$ halocarbon and halohydrocarbon solvents, e.g. methylene chloride, and other members of such groups and mixtures thereof may be selected which are suitable for dissolving the hydroxy containing elastomers concerned, e.g. butane, pentane, cyclohexane, heptane, octane, xylene, carbon tetrachloride, trichloroethylene, and oxygenated solvents immiscible with water.

The processes of the examples are adaptable for either continuous or batch production of the masterbatch. In those instances in which an oil-rubber-silica pigment masterbatch is desired, up to about 45% of oil based on the pigment is added to the elastomer-solvent cement, preferably with a small amount of ammonium hydroxide to aid dispersion of the oil with the elastomer cement and it will thus be understood that the masterbatch and elastomer dispersion contemplated by the invention may contain a minor proportion of oil. Similarly in the examples employing the same, any soluble aluminum salt may be substituted for the hydrated aluminum sulfate, e.g. aluminum ammonium sulfate or aluminum sodium sulfate, and the reactant solution contemplated by the invention may thus comprise minor amount of ammonium and/or alkali metal salts without detriment to the process. Furthermore the elastomer cement and/or the aqueously wet silica pigment and/or the aqueous reactant solution may contain a small proportion of ammonium hydroxide which appears in certain instances to facilitate practice of the invention. When carbon black is also to be included in the elastomer-silica pigment masterbatch, it may be incorporated as an aqueous slurry along with the slurry of the silica pigment, but preferably is incorporated in the silica pigment slurry itself.

In the following tabulations of examples the ingredients (A), (B), (C) etc. are listed in the order of their addition except where otherwise specifically set forth. The masterbatches are conveniently prepared at room temperatures, however, elevated temperatures may be employed so as to accelerate the masterbath formation. Except where otherwise noted, the proportions are by weight.

As above noted, polymer-silica masterbatches may also be prepared containing processing oils and/or carbon black without departing from the invention. In such practice, from 0 to 75 parts by weight of carbon black may be employed (with the limitation that the total quantity of silica pigment and carbon black, dry basis, not exceed 100 parts by weight, per 100 parts of the elastomers) and/or from 0 to 45 parts by weight of processing oil may be employed. The carbon black may be any commercial carbon black suitable for rubber compounding, e.g. the trademarked blacks; Philblack O, Statex K, Thermax, Kosmobile 77, or the like, and preferably is dispersed in the treated wet silica pigment; and the processing oil may be any of the processing oils suitable for use in rubber compounding, e.g. petroleum oils of the naphthenic, aromatic, and highly aromatic categories, which are commercially available under trademark designation, such as Circosol 2XH, Sundex 53, Shell SPX97, Dutrex 20, and Califlux TT, and other oils suitable for rubber compounding or the oil-extension of synthetic rubber, among which are the predominantly aromatic Sundex (TM) and Shell Dutrex (TM) oils, and the predominantly paraffinic or naphthenic Sunpar (TM), Sunthene (TM), Circosol (TM), and Shellflux (TM) oils, and the like.

The following Examples 1–33 are illustrative of such modes of practicing the invention.

In the examples, in Table III, Examples 1–4, precursor butadiene-styrene copolymers produced by solution polymerization and precursor butyl type rubber are dissolved in solvents and solution grafted with hydroxyl type monomers.

In Table IV, Examples 5–8, aqueous silica pigment slurries having a bound alkali content are reacted with soluble aluminum, zinc and calcium salts, respectively, and then solution masterbatched with the hydroxy containing solution elastomers prepared according to Table III.

In Table V, Examples 9–12, the wet silica pigments are treated with zinc and calcium salts and combined with carbon black with or without processing oil and masterbatched from solution with the hydroxyl group containing polymer.

In Table IV the precursor polymers butyl rubber, SB–R and ethylene-propylene copolymers are solution grafted with hydroxyl group containing ethylenically unsaturated monomers.

In Table VII the treated wet silica pigment is combined with polymer solutions of butyl, butadiene-styrene and ethylene propylene polymer grafted with hydroxyl group containing monomers and the volatiles are removed to prepare the masterbatch.

In Table VIII the aluminum salt, acid and calcium salt treated wet alkaline silica pigments are combined with carbon black, and in Example 21 also processing oil, to make a smooth paste with the aid of the Waring Blendor and further intimately mixed with the solutions of hydroxy graft polymers of Table VI. The solvent is removed with the aid of boiling water and the masterbatch recovered.

In Table IX elastomers containing hydroxyl groups are prepared by emulsion copolymerization and the copolymers recovered by running the latex into isopropanol containing antioxidant and after drying the elastomer is dissolved in solvent.

On Table X wet alkaline silica pigments treated with acid, aluminum, zinc and calcium aqueous salt solutions are combined with the solutions of hydroxyl group containing polymers prepared according to Table IX and the mixture recovered as a masterbatch.

In Table XI the examples are similar to Table X except that carbon black and processing oil are included in the blend resulting in the masterbatch.

TABLE III.—SOLUTION OF GRAFT POLYMER HAVING HYDROXYL GROUPS

[Parts by wt.]

| Example | 1 | 2 | 3 | 4 |
|---|---|---|---|---|
| (A) Graft polymer solution: | | | | |
| (a) Polymer solution: | | | | |
| 18.5% isobutyleneisoprene in hexane [1] | 135 | 135 | | |
| 10% butadiene-styrene in benzene [2] | | | 250 | 250 |
| Benzene | 115 | 115 | 250 | 250 |
| Dry solids basis | 25 | 25 | 25 | 25 |
| (b) Monomer: | | | | |
| 33% hydroxyethyl vinyl sulfide in benzene | 2.25 | | 2.25 | |
| 33% hydroxyethyl methacrylate in benzene | | 2.25 | | 2.25 |
| (c) Catalyst: | | | | |
| 25% cumene hydroperoxide in benzene | 2 | 2 | 2 | 2 |
| 10% tetraethylenepentamine in benzene | 2 | 2 | 2 | 2 |
| (d) Polymerization condition: | | | | |
| Temperature, °C | 50 | 50 | 50 | 50 |
| Time, hrs | 4 | 4 | 4 | 4 |

[1] Butyl Rubber 268, a trademark product.
[2] A trademark product, a normal viscosity, non-staining, solution polymerized random 75/25 copolymer of butadiene and styrene.

TABLE IV.—SILICA-POLYMER MASTERBATCH

[Parts by wt.]

| Example | 5 | 6 | 7 | 8 |
|---|---|---|---|---|
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reagent-aqueous solution: 2% aluminum sulfate [1] | 8.5 | 8.5 | 8.5 | 8.5 |
| (C) Blending (A) and (B): Blend,[2] min. | 0.5 | 0.5 | 0.5 | 0.5 |
| (D) Graft polymer solution: | | | | |
| Example: | | | | |
| 1 | 50 | | | |
| 2 | | 50 | | |
| 3 | | | 100 | |
| 4 | | | | 100 |
| Dry solids basis | 5 | 5 | 5 | 5 |
| Antioxidant [3] | 0.1 | 0.1 | 0.1 | 0.1 |
| (E) Blending (C) and (D): Blend,[2] min. | 0.5 | 0.5 | 0.5 | 0.5 |
| (F) Solvent removal:[4] | | | | |
| Boiling water (X) | X | X | X | X |
| Silica separation into serum | None | None | None | None |
| (G) Masterbatch: Dried (105° C.) (X) | X | X | X | X |

[1] Aluminum sulfate $Al_2(SO_4)_3 \cdot 14H_2O$.
[2] Waring Blender, a trademark product.
[3] Antioxidant is 2,2'-methylene-bis(4-methyl-6-t.-butylphenol).
[4] The silica-solved polymer masterbatch is dropped into boiling water to vaporize the solvent and the silica-polymer masterbatch is recovered and dried.

TABLE V.—SILICA-POLYMER MASTERBATCH

[Parts by wt.]

| Example | 9 | 10 | 11 | 12 |
|---|---|---|---|---|
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reagent-aqueous solution: | | | | |
| 2% zinc sulfate | 7.0 | 7.0 | | |
| 2% calcium chloride | | | 5.0 | 5.0 |
| (C) Carbon black and/or processing oil: | | | | |
| Statex 160HR [1] | 5 | 5 | 5 | 5 |
| Sundex 2XH [2] | | | | 1 |
| (D) Blending (A) and (B) then (C): Blend,[3] min. | 0.5 | 0.5 | 0.5 | 0.5 |
| (E) Graft polymer solution: | | | | |
| Example 3 | 300 | | 300 | |
| Example 4 | | 300 | | 300 |
| Dry solids basis | 15 | 15 | 15 | 15 |
| Antioxidant [4] | 0.1 | 0.1 | 0.1 | 0.1 |
| (F) Blending (D) and (E): Blend,[3] min. | 0.5 | 0.5 | 0.5 | 0.5 |
| (G) Solvent removal:[5] | | | | |
| Boiling water (X) | X | X | X | X |
| Silica separation into serum | None | None | None | None |
| (H) Masterbatch: Dried (105° C.) (X) | X | X | X | X |

[1] Carbon black, a trademark product.
[2] Processing oil, a trademark product.
[3] Waring Blender, a trademark product.
[4] Antioxidant is 2,2'-methylene-bis(4-methyl-6-t.-butylphenol).
[5] The silica-solvated polymer combination is dropped into boiling water to vaporize the solvent and the silica-polymer masterbatch is recovered and dried.

TABLE VI.—SOLUTIONS OF GRAFT POLYMERS HAVING HYDROXYL GROUPS

[Parts by wt.]

| Example | 13 | 14 | 15 | 16 |
|---|---|---|---|---|
| (A) Graft polymer solution: | | | | |
| (a) Polymer solution: | | | | |
| 10% isobutylene isoprene in hexane [1] | 500 | | 500 | |
| 10% butadienestyrene in hexane [2] | | 500 | | |
| 10% ethylene-propylene in hexane [3] | | | | 500 |
| Dry solids basis | 50 | 50 | 50 | 50 |
| (b) Monomers: | | | | |
| 33% hydroxylethyl methacrylate* | 15 | 15 | | |
| 33% 2-hydroxylethyl vinyl sulfide* | | | 15 | |
| 33% hydroxypropyl methacrylate* | | | | 15 |
| (c) Catalyst: | | | | |
| 25% cumene hydroperoxide in benzene | 4 | 4 | 4 | 4 |
| 10% tetraethylenepentamine in benzene | 4 | 4 | 4 | 4 |
| (d) Polymerization condition: | | | | |
| Temp., °C | 50 | 50 | 50 | 50 |
| Time, hrs | 7 | 7 | 7 | 7 |

[1] Butyl Rubber 268, a trademark product.
[2] SBR-1502.
[3] EPR-404, a trademark product.
*In benzene.

TABLE VII.—SILICA-POLYMER MASTERBATCH

[Parts by wt.]

| Example | 17 | 18 | 19 | 20 |
|---|---|---|---|---|
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reagent-aqueous solution: | | | | |
| 2% aluminum sulfate [1] | 8.5 | | | |
| 2% calcium sulfate | | 5.0 | | |
| 2% zinc sulfate | | | 7.0 | |
| (C) Combine (A) and (B): | | | | |
| Blend (X) | X | X | X | X |
| Filter (X) | X | X | X | X |
| (D) Graft polymer solution, Table VI: | | | | |
| Example: | | | | |
| 13 | 52 | | | |
| 14 | | 52 | | |
| 15 | | | 52 | |
| 16 | | | | 52 |
| Dry solids basis | 5 | 5 | 5 | 5 |
| Antioxidant [2] | 0.1 | 0.1 | 0.1 | 0.1 |
| (E) Combine (A) and (B) then (C): Blend,[3] min. | 0.5 | 0.5 | 0.5 | 0.5 |
| (F) Solvent removal:[4] | | | | |
| Boiling water (X) | X | X | X | X |
| Silica separation into serum | None | None | None | None |
| (G) Masterbatch: Dried (105° C.) (X) | X | X | X | X |

[1] Aluminum sulfate $Al_2(SO_4)_3 \cdot 14H_2O$.
[2] Antioxidant 2,2'-methylene-bis(4-methyl-6-t.-butylphenol).
[3] Waring Blender, a trademark product.
[4] The silica-solvated graft polymer combination is dropped into boiling water to vaporize the solvent and the silica-polymer masterbatch is recovered.

TABLE VIII.—SILICA-POLYMER MASTERBATCH

[Parts by wt.]

| Example | 21 | 22 | 23 | 24 |
|---|---|---|---|---|
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reagent-aqueous solution: | | | | |
| 2% aluminum sulfate [1] | 8.5 | | | |
| 2% sulfuric acid | | | 4.5 | |
| 2% calcium chloride | | | | 5.0 |
| (C) Combine (A) and (B): | | | | |
| Blend (X) | X | X | X | X |
| Filter (X) | X | X | X | X |
| (D) Carbon black and processing oil: | | | | |
| Philblack O [2] | 5 | | | |
| Statex 160HR [2] | | 5 | | 5 |
| Thermax [2] | | | 5 | |
| Circosol 2XH [3] | 1 | | | |

See footnotes at end of table.

TABLE VIII.—Continued

| Example | 21 | 22 | 23 | 24 |
|---|---|---|---|---|
| (E) Combine (C) and (D): blend,[4] min. | 0.5 | 0.5 | 0.5 | 0.5 |
| (F) Graft polymer solution, Table VI: Example: | | | | |
| 13 | 156 | | | |
| 14 | | 156 | | |
| 15 | | | 156 | |
| 16 | | | | 156 |
| Dry solids basis | 15 | 15 | 15 | 15 |
| Antioxidant [5] | 0.3 | 0.3 | 0.3 | 0.3 |
| (G) Combine (E) and (F): blend,[4] min. | 0.5 | 0.5 | 0.5 | 0.5 |
| (H) Solvent removal:[6] | | | | |
| Boiling water (X) | X | X | X | X |
| Silica and/or black separation in serum | None | None | None | None |
| (I) Masterbatch: Dried (105° C.) (X) | X | X | X | X |

[1] Aluminum sulfate $Al_2(SO_4)_3 \cdot 14H_2O$.
[2] Carbon black, a trademark product.
[3] Processing oil, a trademark product.
[4] Waring Blender, a trademark product.
[5] Antioxidant 2,2'-methylene-bis(4-methyl-6-t.-butylphenol).
[6] The silica-carbon black-solvated grafted polymer combination is dropped into boiling water to vaporize the solvent and the silica-carbon black-polymer masterbatch is recovered.

TABLE IX.—PREPARATION OF POLYMER WITH HYDROXYL GROUPS

[Parts by wt.]

| Example | 25 | 26 | 27 |
|---|---|---|---|
| (A) Polymer latex: Recipe: | | | |
| Tallow soap | 5 | 5 | 6 |
| Water | 180 | 180 | 220 |
| Styrene | 20 | 20 | 20 |
| Hydroxyethyl methacrylate | | | 3 |
| Hydroxypropyl methacrylate | 5 | | |
| N-methylolmethacrylamide (60% aqueous) | | 5 | |
| Butadiene-1,3 | 80 | 80 | 80 |
| Potassium persulfate | 1 | 1 | 1 |
| Mercaptan MTM [1] | 0.8 | 0.8 | 0.8 |
| Conditions: | | | |
| Temp.,° C | 50 | 50 | 50 |
| Hours | 4 | 6.5 | 4 |
| (B) Coagulation: (a) Poured into— | | | |
| Isopropanol | 800 | 800 | 800 |
| Antioxidant [2] | 20 | 20 | 30 |
| Hydrochloric acid, conc | 20 | 20 | 20 |
| (b) Coagulum: | | | |
| Filtered, dried (105° C.) (X) | X | X | X |
| Yield | 51 | 57 | 56 |

[1] A tertiary mixed $C_{12}$, $C_{14}$ and $C_{16}$ mercaptan, a trademark product.
[2] Antioxidant 2,2'-methylene-bis(4-methyl-6-t.-butylphenol).

TABLE X.—SILICA-POLYMER MASTERBATCH

[Parts by wt.]

| Example | 28 | 29 | 30 |
|---|---|---|---|
| (A) Silica pigment slurry: | | | |
| Alkaline silica pigment-I (pH=8.5-9.5) | 25 | 25 | 25 |
| Dry solids basis | 2.5 | 2.5 | 2.5 |
| Water | 40 | 40 | 40 |
| (B) Reagent aqueous solution: | | | |
| 2% aluminum sulfate [1] | 8.5 | 8.5 | 8.5 |
| 5.6% aqueous ammonia | 1 | 3 | 3 |
| (C) Combine (A) and (B): | | | |
| Blend (X) | | X | X |
| Filter (X) | | X | X |
| (D) Polymer solution polymer, Table IX: Example: | | | |
| 25 | 5 | | |
| 26 | | 5 | |
| 27 | | | 5 |
| Antioxidant [2] | 0.1 | 0.1 | 0.1 |
| Solvent, benzene | 45 | 45 | 45 |
| Polymer solvated (X) | X | X | X |
| (E) Combine (C) and (D): Blend, min | 0.5 | 0.5 | 0.5 |
| (F) Solvent removal:[4] | | | |
| Boiling water (X) | X | X | X |
| Silica separation into serum | None | None | None |
| (G) Masterbatch: Dried (105° C.) (X) | X | X | X |

[1] Aluminum sulfate $Al_2(SO_4)_3 \cdot 14H_2O$.
[2] Antioxidant 2,2'-methylene-bis(4-methyl-6-t.-butylphenol).
[3] Waring Blendor, a trademark product.
[4] The silica-solvated polymer combination is dropped into boiling water to vaporize the solvent and the silica-polymer masterbatch is recovered and dried.

TABLE XI.—SILICA-POLYMER MASTERBATCH WITH CARBON BLACK AND PROCESSED OIL

[Parts by wt.]

| Example | 31 | 32 | 33 |
|---|---|---|---|
| (A) Silica pigment slurry: | | | |
| Alkaline silica pigment-I (pH=8.5-9.5) | 25 | 25 | 25 |
| Dry solids basis | 2.5 | 2.5 | 2.5 |
| Water | 40 | 40 | 40 |
| (B) Reagent-Aqueous Solution | | | |
| 2% aluminum sulfate [1] | 8.5 | | |
| 2% sulfuric acid | | 4.5 | |
| 2% calcium chloride | | | 5.0 |
| (C) Combine (A) and (B): | | | |
| Blend (X) | X | X | X |
| Filter (X) | X | X | X |
| (D) Carbon Black and Processing oil: | | | |
| Philblack O [2] | 5 | | 5 |
| Statex 160HR [2] | | 5 | |
| Thermax [2] | | | 5 |
| Circosol 2XH [3] | 1 | | |
| (E) Combine (C) and (D): Blend,[4] min | 0.5 | 0.5 | 0.5 |
| (F) Polymer solution, polymer, Table IX: Example: | | | |
| 25 | 16 | | |
| 26 | | 16 | |
| 27 | | | 16 |
| Antioxidant [5] | 0.3 | 0.3 | 0.3 |
| Solvent, benzene | 144 | 144 | 144 |
| Polymer solvated (X) | X | X | X |
| (G) Combine (E) and (F): Blend,[4] min | 0.5 | 0.5 | 0.5 |
| (H) Solvent removal:[6] | | | |
| Boiling water (X) | X | X | X |
| Silica and/or carbon black separated into serum | None | None | None |
| (I) Masterbatch: Dried (105° C.) (X) | X | X | X |

[1] Aluminum sulfate $Al_2(SO_4)_3 \cdot 14H_2O$.
[2] Carbon black, trademark product.
[3] Processing oil, a trademark product.
[4] Waring Blendor, a trademark product.
[5] Antioxidant 2,2'-methylene-bis(4-methyl-6-t.-butylphenol).
[6] The silica-carbon black-solvated polymer combination is dropped into boiling water to vaporize the solvent and the silica-carbon black master-batch is recovered and dried.

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by forming the same with elastomers provided with certain substituent groups improving the compatibility of the elastomer with the aqueously wet silica pigment.

In certain co-pending applications filed concurrently herewith, different modes of improving elastomer-silica pigment masterbatches are provided by employing wet silica pigment rendered more compatible with elastomers by combining with the wet silica pigment certain conditioning materials.

To maintain clear lines of division between the co-pending applications the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch, which process comprises:

(a) providing an organic solvent dispersion of elastomer containing (1) 100 parts of the elastomer by weight, (2) the solvent of which is essentially water immiscible, and (3) the elastomer of which consists essentially of hydroxy containing elastomer having from 0.1 to 10% of its weight consisting of substituent hydroxyl groups;

(b) providing 5 to 75 parts by weight, dry basis, of aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide and filtered and washed; and which has continuously been maintained in an aqueously wet state without having been dried after its precipitation;

(c) combining the wet silica pigment provided by step (b) with from 0 to at least a stoichiometric equivalent, based on the alkalinity of the silica pigment slurry, of reactant selected from the class consisting of the members of the following groups: Group (I), the water soluble salts of aluminum or zinc; Group (II) the water soluble salts of the alkaline earth metal; Group (III) the mineral and water soluble organic acids; and Group (IV) combinations of any two or more of such members; thereby to provide a wet silica pigment for use in step (d);

(d) then intimately mixing the solvent dispersion of hydroxy containing elastomer provided by step (a), together with (1) the wet silica pigment provided for use by step (c), (2) from 0 to 75 parts by weight of carbon black with the limitation that the total of silica pigment and carbon black, dry basis, not exceed 80 parts by weight, and (3) from 0 to 45 parts by weight of processing oil, and (e) separating the volatiles from the resulting masterbatch.

2. A process for preparing a masterbatch from wet silica pigment and a solvent dispersion of elastomer as claimed in claim 1, in which the elastomer of the solvent dispersion provided in step (a) is a hydroxy containing polymer prepared by emulsion polymerization of ethylenically unsaturated monomer material consisting at least in part of a quantity of hydroxy containing monomer material having sufficient hydroxyl groups therein to form the hydroxy containing elastomer.

3. A process for preparing a masterbatch from wet silica pigment and a solvent dispersion of elastomer as claimed in claim 1, in which the elastomer of the solvent dispersion provided in step (a) is a hydroxy containing graft polymer prepared by (1) forming a precursor polymer latex by emulsion polymerization of ethylenically unsaturated monomer material, and (2) thereafter grafting hydroxy containing monomer material to the polymer in said latex by aqueous graft polymerization.

4. A process for preparing a masterbatch from wet silica pigment and a solvent dispersion of elastomer as claimed in claim 1, in which the elastomer of the solvent dispersion provided in step (a) is a hydroxy containing graft polymer prepared by (1) forming a precursor polymer latex by emulsion polymerization of ethylenically unsaturated monomer material, (2) converting the so formed precursor polymer from the latex to a solvent solution, and (3) thereafter grafting hydroxy containing monomer material thereto by solution graft polymerization.

5. A process for preparing a masterbatch from wet silica pigment and a solvent dispersion of elastomer as claimed in claim 1, in which the elastomer of the solvent dispersion provided in step (a) is a hydroxy containing graft polymer prepared by (1) forming a precursor polymer by solution polymerization of ethylenically unsaturated monomer material and (2) thereafter grafting hydroxy containing monomer material thereto by solution graft polymerization.

6. A process for preparing a masterbatch from wet silica pigment and a solvent dispersion of elastomer as claimed in claim 1, in which the elastomer of the solvent dispersion provided in step (a) is a hydroxy containing polymer prepared by solution polymerization of ethylenically unsaturated monomer material consisting at least in part of a quantity of hydroxy containing monomer material having sufficient hydroxyl groups therein to form the hydroxy containing elastomer.

7. A process as claimed in claim 1, in which the solvent employed in step (a) itself or as an aqueous azeotrope has a boiling point lower than that of water at atmospheric pressure, and in which step (e) is effected by (1) volatilizing solvent from the intimate mixture to convert said mixture to coagulum and aqueous serum, and (2) then separating the coagulum from the serum as a masterbatch.

8. A process as claimed in claim 1, in which at least 5 parts by weight of carbon black are employed in step (d).

9. A process as claimed in claim 1, in which at least 5 parts by weight of processing oil are employed in step (d).

10. A process as claimed in claim 1, in which the reactant selected for step (c) is acidic and is employed in sufficient quantity in step (c) to neutralize at least a part of the alkalinity of the wet silica pigment provided in step (a).

11. A process as claimed in claim 10, in which the quantity of reactant employed in step (c) is sufficient to at least neutralize the alkalinity of the wet silica pigment provided in step (a).

12. A process as claimed in claim 11, in which the quantity of reactant employed in step (c) is more than sufficient to neutralize the alkalinity of the wet silica pigment provided by step (a).

References Cited
UNITED STATES PATENTS

| | | | |
|---|---|---|---|
| 2,821,232 | 1/1958 | Wolf | 152—330 |
| 3,042,661 | 7/1962 | Kirshenbaum et al. | 260—83.3 |
| 3,061,577 | 10/1962 | Pruett | 260—41 |
| 3,081,276 | 3/1963 | Snyder et al. | 260—33.6 |
| 3,172,726 | 3/1965 | Burke et al. | 23—182 |
| 3,244,660 | 4/1966 | Herold | 260—29.7 |
| 3,250,594 | 5/1966 | Burke et al. | 23—182 |
| 3,264,234 | 8/1966 | Osmond | 260—4 |
| 3,401,213 | 9/1968 | Trementozzi | 260—880 |

MORRIS LIEBMAN, Primary Examiner

J. H. DERRINGTON, Assistant Examiner

U.S. Cl. X.R.

260—41 R, 41 A, 41.5 R, 41.5 A, 41.5 MP